Dec. 12, 1967   A. B. WHITE   3,358,117
ELECTRODE HOLDER
Filed Dec. 9, 1964   3 Sheets-Sheet 1

INVENTOR.
ALFRED B. WHITE
BY
ATTORNEY

Dec. 12, 1967   A. B. WHITE   3,358,117
ELECTRODE HOLDER
Filed Dec. 9, 1964   3 Sheets-Sheet 2

INVENTOR.
ALFRED B. WHITE
BY *M. A. Hobbs*
ATTORNEY

Dec. 12, 1967   A. B. WHITE   3,358,117
ELECTRODE HOLDER

Filed Dec. 9, 1964   3 Sheets-Sheet 3

INVENTOR.
ALFRED B. WHITE
BY
ATTORNEY

United States Patent Office 3,358,117
Patented Dec. 12, 1967

3,358,117
ELECTRODE HOLDER
Alfred B. White, 162 S. Post Road,
Buchanan, Mich. 49107
Filed Dec. 9, 1964, Ser. No. 417,023
7 Claims. (Cl. 219—120)

ABSTRACT OF THE DISCLOSURE

A holder for a welding electrode tip, having a body with a tapered bore for receiving the tapered end of the electrode tip, and a slot extending transversely through the bore. A plunger, mounted in the bore and engaging the end of the tip, is operated to remove the tip by an actuator disposed in the transverse slot, the actuator being movable in at least three directions to cause the plunger to dislodge the tip.

---

Since welding machines are often designed for special purposes to fabricate products of various shapes and sizes and with a number of points or seams to be welded, a relatively large number of electrodes are employed and these are often closely spaced and located in inaccessible and awkward places to reach in replacing the used electrodes. One of the most important applications of spot welding is in the automotive and appliance field where the welding machines employ up to several hundred prepositioned tips, each tip usually actuated by an air or hydraulic cylinder mounted on a frame massive enough to withstand the combined force of the air or hydraulic cylinder without excessive deflection. Often the electrode and holders are so closely spaced that special types of double or triple cylinders have been developed to provide the required tip force in the limited center-to-center distance. This close spacing and the large number of electrodes create special problems in repairing and servicing the equipment. Consequently, the task of changing the electrodes is difficult and tedious and involves a substantial amount of down time of the welding equipment. Further, the electrodes, which are retained in the holder by a Morse taper, tend to stick and consequently must be removed by the use of some tool, such as pliers, wrenches, vise-grips or chisels, and these tools are often difficult to use effectively where the electrodes are closely spaced. While some holders are provided with a type of ejector, these ejectors are often difficult or impossible to use where the electrodes are closely spaced, so that the electrodes are removed either by twisting or tapping directly with a tool. It is therefore one of the principal objects of the invention to provide a holder for a welding electrode which can easily be manipulated in restricted or limited space to release the electrode whenever it is to be changed or reconditioned, and which will hold the electrode firmly and effectively in place as long as the welding equipment is in use.

Another object of the invention is to provide a welding electrode holder having incorporated therein an ejector for removing the electrodes therefrom which can be operated by merely tapping a part thereof with a tool, such as a small hammer, wrench or screwdriver, from a number of different positions or angles, and which can be operated with little force or movement.

Still another object of the invention is to provide an ejector type electrode holder which can be used in any standard or conventional welding machine, and which does not require any more additional space in the machine than the conventional electrode holders.

A further object is to provide an electrode holder of the aforesaid type which is adapted to hold any of the standard electrodes of the type for which the holder is designed to give optimum performance and to effectively eject the electrodes without causing any scoring, deformation or other damage to the electrode, and which will extend the life of the various operating parts of the holder so that costly repair and replacement of the holder are materially reduced over the conventional holders.

Another object of the invention is to provide a relatively simple, compact and easily installed welding electrode holder having an ejector which does not interfere with the normal operation of the electrode and welding equipment, and which is so constructed and designed that it can perform any operation handled by the conventional electrode holder.

Additional objects and advantages of the present invention will become apparent from the following description and accompanying drawings, wherein.

Figure 1:
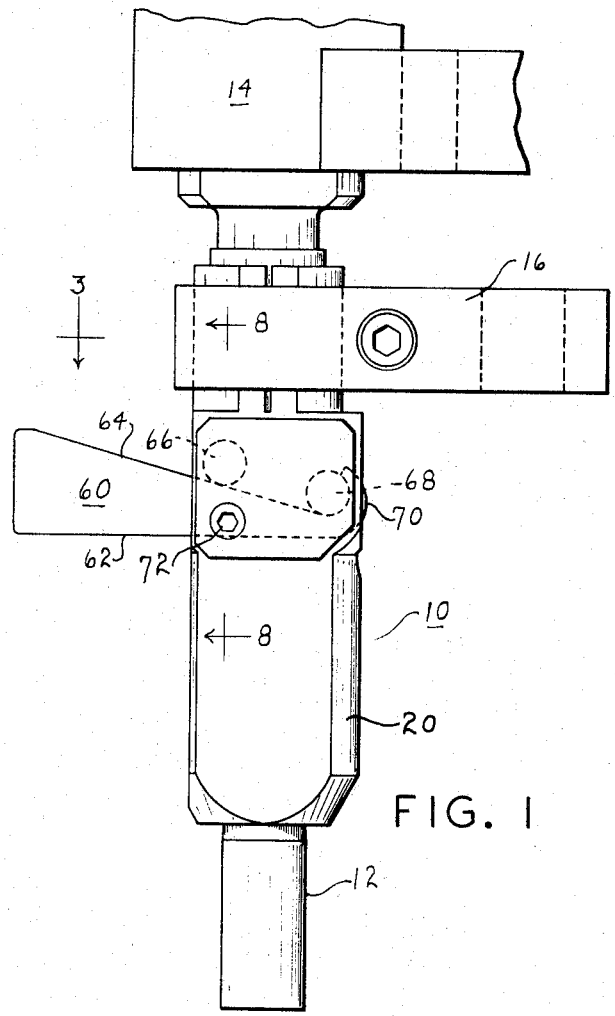
FIGURE 1 is a side elevational view of an electrode holder showing the holder mounted in a welding machine and having an electrode mounted therein.
Figure 2:
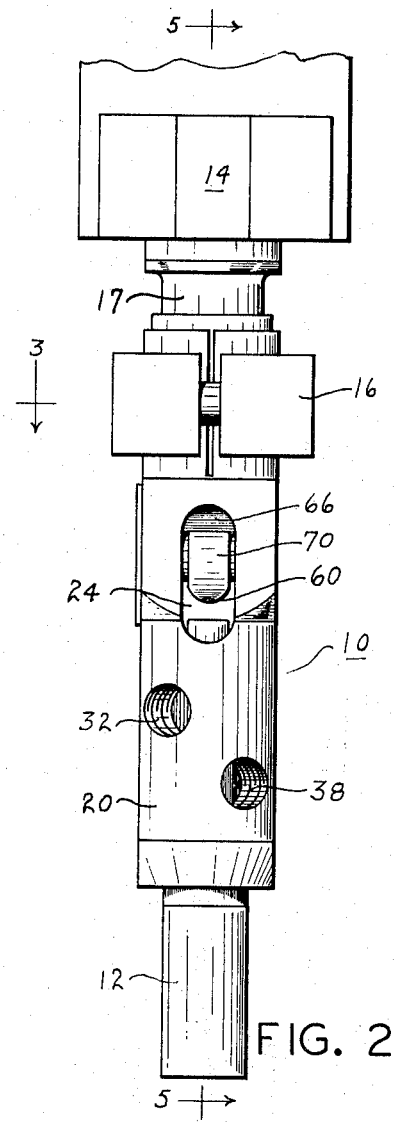
FIGURE 2 is a front elevational view of the electrode holder shown in FIGURE 1.
Figure 3:
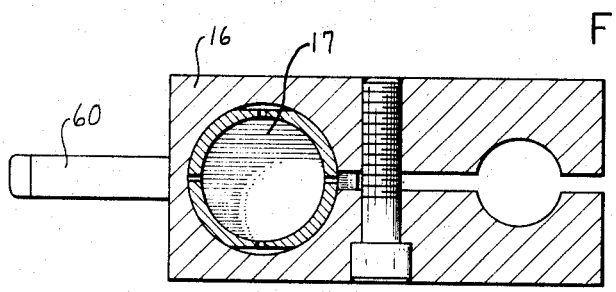
FIGURE 3 is a horizontal cross sectional view of the electrode holder and current connection shown in FIGURES 1 and 2, the section being taken on line 3—3 of FIGURE 1.
Figure 4:
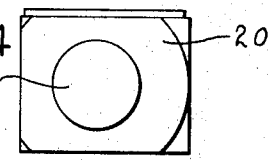
FIGURE 4 is a bottom view of the holder and tip shown in FIGURE 1.

Referring more specifically to the drawings and to FIGURES 1 and 2 in particular, numeral 10 designates the present holder, having a welding electrode tip 12 mounted therein, the holder being supported by arm 14 and connected to the source of electrical power by current connector clamp 16 rigidly clamped to the upper end of holder 10. A cable or bus bar (not shown) is bolted or clamped to the free end of clamp 16. The particular type of support, clamp and electrode used in the equipment is not important to the present invention and the holder may be successfully adapted to the various types of arrangements. A shaft 17 extending downwardly and rigidly connected to support 14 is received in a socket 18 in the upper end of the holder and is insulated therefrom by cup-shaped member 19.

Figure 5:
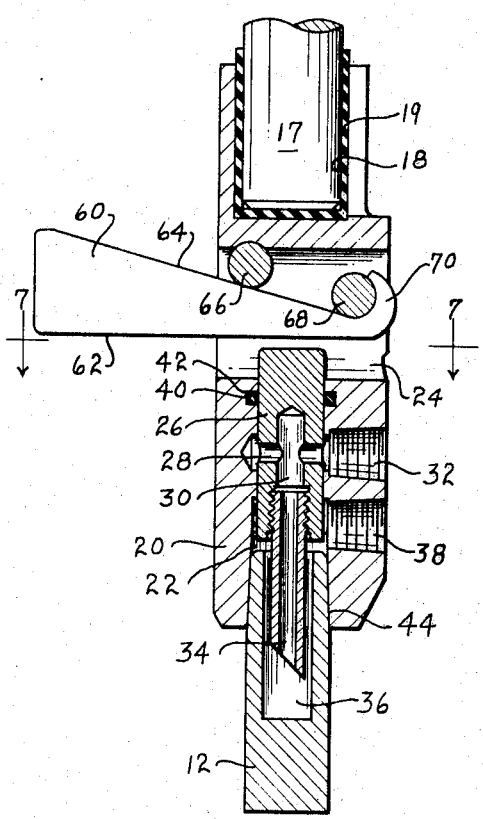
FIGURE 5 is a vertical cross sectional view of the holder and tip shown in FIGURE 1, illustrating the ejector mechanism in one position, the section being taken on line 5—5 of FIGURE 2.
Figure 6:
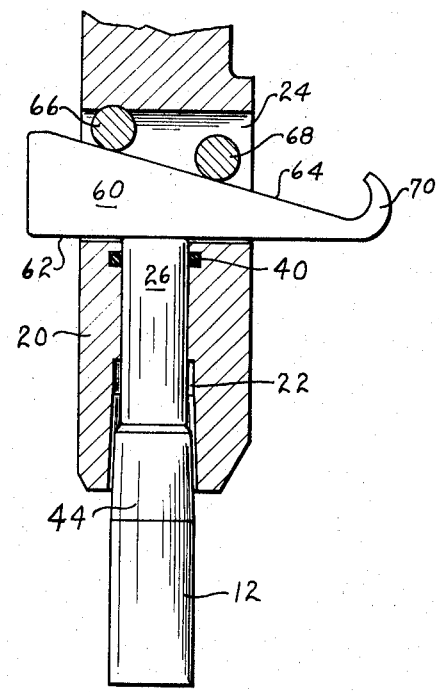
FIGURE 6 is a vertical cross sectional view, similar to the view shown in FIGURE 5, illustrating the ejector mechanism in a different position.
Figure 7:
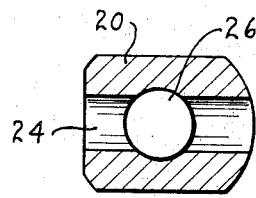
FIGURE 7 is a horizontal cross sectional view of the holder shown in the previous figures, the section being taken on line 7—7 of FIGURE 5.
Figure 11:
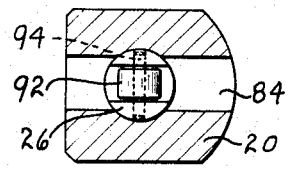
FIGURE 11 is a horizontal cross sectional view taken on line 11—11 of FIGURE 9.
Figures 9, 10:
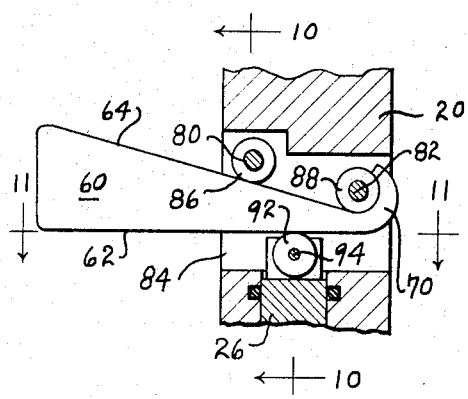
FIGURE 9 is a fragmentary cross sectional view similar to that shown in FIGURE 5, illustrating a modified form of ejector mechanism.
FIGURE 10 is a vertical cross sectional view of the ejector shown in FIGURE 9, the section being taken on line 10—10 of said figure.

The holder shown in FIGURES 1 and 2 consists of a body 20 having a bore 22 extending vertically through the lower portion thereof and intersecting a slot 24 near the upper end of the body. The bore contains a plunger 26 having water coolant passages 28 and 30, the former being connected to water inlet passage 32 and the latter being connected to tube 34 which is secured in the lower end of plunger 26 and extends downwardly into the hollow interior 36 of electrode 12. The hollow interior of the electrode is connected by a portion of bore 22 with water outlet 38 in the side of body 20. The upper end of plunger 26 is sealed in fluid-tight relationship by a gasket 40 seated in annular groove 42 in the upper end of bore 22. It is thus seen that water entering through inlet passage 32 passes inwardly through passage 28, downwardly through passage 30 and tube 34, and into the hollow interior 36 of the electrode, and thence outwardly through bore 22 and outlet passage 38. The plunger is in bore 22 and is adapted to move upwardly and downwardly therein from a position with the upper end thereof extending into slot 24, as illustrated in FIGURE 5, to a position with the upper end thereof substantially flush with the bottom of the slot, as illustrated in FIGURE 6. The upper end of electrode tip 12 and the lower end of bore 22 are provided with a Morse taper 44 which retains the electrode releasably in place in the lower end of body 20.

The mechanism for removing the electrode 12 consists of a triangularly shaped actuator 60 having a straight horizontal lower side 62 and a sloping upper side 64 for engaging the upper end of plunger 26 and for engaging the lower side of pins 66 and 68, respectively. The two pins are spaced laterally from one another with pin 66 being positioned on a plane above pin 68, the two pins being seated in the side walls of the body on either side of slot 24, and held in position by any suitable means, such as by a snug fit. The small end of the actuator is preferably provided with a hook or stop 70 which prevents the actuator from becoming dislodged from the slot, and which holds the actuator in place ready for operation whenever the tip is to be removed.

Figure 8:
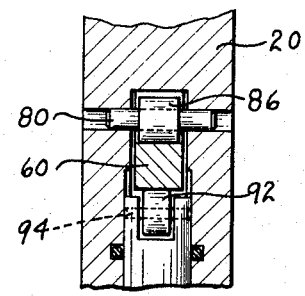
FIGURE 8 is a fragmentary cross sectional view taken on line 8—8 of FIGURE 1.

FIGURE 5 illustrates the position of the actuator whenever the actuator is not in use and FIGURE 6 illustrates the position of the actuator when it has completed the operation of dislodging the tip from the holder. The actuator is yieldably held in any fixed position by a set screw 72 extending through one side of the body and projecting into the slot as illustrated in FIGURE 8. In this position the set screw places a light pressure on the side of the actuator, thus holding the actuator in any desired position ready for use to remove the tip.

Whenever a tip is to be removed the actuator is moved inwardly until the lower side 62 is in engagement with the upper end of plunger 26 and is pressed or tapped in any one of several different directions. If space permits, the normal procedure is to tap or press actuator 60 to the right as viewed in FIGURES 5 and 6, moving the actuator from the position shown in FIGURE 5 to the position shown in FIGURE 6. As the actuator moves to the right, the upper surface 64 bearing against pins 66 and 68 causes the actuator to move downwardly, causing lower side 62 to engage the upper end of the plunger and forcing the plunger downwardly in bore 22, the lower end of the plunger engaging the upper end of tip 12, forcing the tip downwardly sufficiently to disengage the two tapered surfaces of the Morse taper, as clearly seen in FIGURE 6. As soon as the tip has been dislodged in the foregoing manner, it will fall of its own weight from the bore and holder. When the tip is to be reinserted, the actuator 60 is merely withdrawn from the position shown in FIGURE 6 to the position shown in FIGURE 5, thus permitting plunger 26 to move upwardly to its original position as tip 12 is pushed or otherwise forced into the lower end of bore 22 until the tapered surfaces of the bore and tip are in firm engagement, thus holding the tip in place in the holder. The angle on the upper side of the actuator may be sufficiently steep that the actuator can be moved to the left, as viewed in FIGURE 5, by the upward pressure of plunger 26 on the lower side of the actuator, to permit the tip to seat without any interference from the actuator.

One of the important advantages of the present type of ejector is the fact that it can be operated from a number of different positions by merely tapping the actuator with a hammer, wrench, screwdriver or other small tool. For example, if the holders are located in such close proximity to one another that the actuator cannot effectively be tapped on the outer end, it may be tapped downwardly, thus causing pin 68 to become a fulcrum for the actuator, resulting in the underside 62 moving angularly downwardly against the upper end of the plunger and thereby pressing the plunger downwardly in the previously described manner as the upper side is further tapped with the tool. Likewise, if the actuator cannot be effectively tapped from above or from the end, it may be tapped on the lower surface near the larger end, thereby causing pin 66 to become the fulcrum, resulting in the angular movement of the inner end of undersurface 62 downwardly against the upper end of plunger 26. Further tapping of the underside of actuator 60 near the large end thereof causes the inner end of the plunger to force the plunger downwardly and eject the electrode. Instead of tapping the underside 62 near the larger end thereof, the smaller end may be tapped after the actuator has been moved to the right sufficiently to disengage the stop 70 from pin 68. In this operation, the pin 68 becomes the fulcrum and, as the end of actuator 60 projecting to the right from pin 68 is tapped, the actuator pivots on pin 68, causing lower side 62 to engage the upper end of plunger 26 and move the plunger downwardly to eject the tip. Likewise, tapping the upper side of hook or stop 70 after it has been disengaged from pin 68 causes the underside 62 of the actuator to engage the upper end of the plunger and thereby move the plunger down and dislodge and eject tip 12. Hook or stop 70 can be used effectively to apply pressure to plunger 26. By placing a screwdriver or similar tool between the hook and adjacent side of body 20, and then prying outwardly, the actuator is pulled inwardly, causing it to move downwardly against the plunger. It is thus seen that six distinct and separate approaches for applying the force to actuator 60 can be effectively performed to apply pressure on the upper end of the plunger and thereby eject the tip.

Two alternate forms as shown in FIGURES 9 through 12 are similar in structure and operation to the previously described embodiment of the present invention; consequently, like numerals will be used to describe like parts. Referring to the modifications shown in FIGURES 9, 10 and 11, pins 80 and 82 extending through slot 84 of the body 20 into the sidewalls thereof are provided with rollers 86 and 88, respectively, on which upper side 64 of actuator 60 rolls. The upper end of plunger 26 contains a slot and has rotatably mounted therein a roller 92 on pin 94, the underside 62 of actuator 60 engaging the roller as the actuator slides to and from the positions corresponding to those illustrated in FIGURES 5 and 6. As the actuator is moved from left to right as viewed in FIGURE 9, either by pushing or tapping in the manner described hereinbefore, the upper side 64 bears against and rolls on rollers 86 and 88 causing the underside 62 to press downwardly on roller 92, thereby pushing plunger 26 downwardly against the upper end of tip 12, causing the tip to disengage itself from the tapered surface and drop from the holder. Hook 70 performs the same function as in the previously described embodiment and any one of the various points on the actuator may be tapped in order to apply the necessary force to the upper end of plunger 26 to remove the tip.

Figure 12:
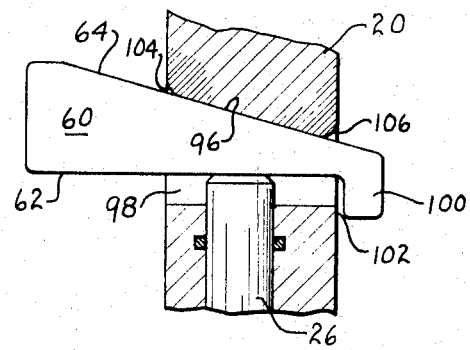
FIGURE 12 is a fragmentary view of a holder showing a further modified form of the ejector mechanism.

The embodiment shown in FIGURE 12 is similar to that shown in the preceding figures; however, in this modification, the pins have been replaced by a tapered or sloping surface 96 along the upper side of slot 98 and curved at the corners thereof. Thus, it is seen that as actuator 60 is pushed inwardly, upper surface 64 engages sloping surface 96 and forces lower side 62 into engagement with the upper end of plunger 26, forcing the plunger downwardly into contact with the upper end of tip 12, and causing the tip to become dislodged from the lower end of bore 22 in the holder body. In this embodiment just described, the hook 100 extends downwardly and prevents actuator 60 from being accidentally removed from slot 98, by contacting the side of body 20 at point 102. The curved corners 104 and 106 serve the same function as the rounded pins and rollers of the previous embodiments. It is therefore seen that as the actuator is tapped on the top or bottom of either the large or the small ends, the corner 104 or 106 acts as the fulcrum point for the actuator to apply the pressure to the upper end of plunger 26.

While three embodiments of the invention have been described in detail herein, various changes and further modifications may be made to satisfy requirements without departing from the scope of the invention.

I claim:

1. A holder for a welding electrode tip having a hollow interior and a tapered end, comprising a body having a vertically positioned bore therein with a tapered outlet for receiving the tapered end of the tip, coolant inlet and outlet passages in said body, a horizontal slot extending through said body and intersecting said bore, a reciprocable plunger in said bore extending into said slot at one end and into said tapered outlet at the other end and having passages communicating with said inlet and outlet coolant passages, a stem on the other end of said plunger extending into the hollow interior of the tip, two spaced pins in said body extending through said slot, one of said pins being spaced further from the end of said plunger than the other, an actuator in said slot extending at both ends therefrom and having one surface at right angles to the axis of said plunger and the surface on the opposite side at an angle corresponding to the difference in distance of said pins from the plunger end, a hook-like portion on the end of said actuator where said surfaces are closest to one another for contact with the adjacent pin to prevent said actuator from being displaced from said slot, said actuator being pivotally movable on said spaced pins and longitudinally movable in said slot, and a set screw disposed in said body and extending into said slot into engagement with said actuator for yieldably retaining said actuator in various positions.

2. A holder for a welding electrode tip having a hollow interior and a tapered end, comprising a body having a bore therein with a tapered outlet for reecuving the tapered end of the tip, coolant inlet and outlet passages in said body, a slot extending through said body and transversely intersecting said bore, a reciprocable plunger in said bore extending into said slot at one end and into said tapered outlet at the other end and having passages communicating with said inlet and outlet coolant passages, two spaced pins in said body extending through said slot, one of said pins being spaced further from the end of said plunger than the other, an actuator in said slot extending at both ends therefrom and having one surface at right angles to the axis of said plunger and the surface on the opposite side at an angle corresponding to the difference in distance of said pins from the plunger end, a lateral projection on the end of said actuator where said surfaces are closest to one another for contact with the adjacent pin to prevent said actuator from being displaced from said slot, said actuator being pivotally movable on said spaced pins and longitudinally movable in said slot, and a means adjustably disposed in said body and extending into said slot into engagement with said actuator for yieldably retaining said actuator in various positions.

3. A holder for a welding electrode tip having a tapered end, comprising a body having a bore therein with a tapered outlet for receiving the tapered end of the tip, a slot extending through said body and transversely intersecting said bore, a reciprocable plunger in said bore extending into said slot at one end and into said tapered outlet at the other end, two spaced pins in said body extending through said slot, one of said pins being spaced further from the end of said plunger than the other, an actuator in said slot extending at both ends therefrom and having one surface at right angles to the axis of said plunger and the surface on the opposite side at an angle corresponding to the difference in distance of said pins from the plunger end, a hook-like portion on the smallest end of said actuator for contact with the adjacent pin to prevent said actuator from being displaced from said slot, said actuator being pivotally movable on said spaced pins and longitudinally movable in said slot, and a set screw in said body and extending into said slot into engagement with said actuator for yieldably retaining said actuator in various positions.

4. A holder for a welding electrode having a tapered end, comprising a body having a bore therein with a tapered outlet for receiving the tapered end of the tip, a slot extending through said body and being connected transversely to said bore, a reciprocable plunger in said bore extending at one end into said slot and into said tapered outlet, two spaced pins in said body extending through said slot, one of said pins being spaced further from the end of said plunger than the other, an actuator in said slot extending at both ends therefrom and having one surface at right angles to the axis of said plunger and the surface on the opposite side at an angle corresponding to the difference in distance of said pins from the plunger end, a lateral projection on the end of said actuator where said surfaces are closest to one another for contact with the adjacent pin, said actuator being pivotally movable on said spaced pins and longitudinally movable in said slot, and a means adjustably disposed in said body and extending into said slot into engagement with said actuator for yieldably retaining said actuator in various positions.

5. A holder for a welding electrode tip having a tapered end, comprising a body having a bore therein with a tapered outlet for receiving the tapered end of the tip, a slot extending through said body and being connected transversely to said bore, a reciprocable plunger in said bore extending into said slot and into said tapered outlet, two spaced pins in said body extending through said slot, one of said pins being spaced further from the end of said plunger than the other, an actuator in said slot extending at both ends therefrom and having one surface at right angles to the axis of said plunger and the surface on the opposite side at an angle corresponding to the difference in distance of said pins from the plunger end, said actuator being pivotally movable on said spaced pins and longitudinally movable in said slot, and a lateral projection on the end of said actuator where said surfaces are closest to one another.

6. A holder for a welding electrode tip having a tapered end, comprising a body having a bore therein with a tapered outlet for receiving the tapered end of the tip, a slot extending through said body and being connected transversely to said bore, a reciprocable plunger in said bore extending into said slot at one end and into said tapered outlet at the other end and having a recess in said end, two spaced pins in said body extending through said slot, one of said pins being spaced further from the end of said plunger than the other, an actuator in said slot extending at both ends therefrom and having one surface at right angles to the axis of said plunger and the surface on the opposite side at an angle corresponding to the difference of said pins, a hook-like portion on the smallest end of said actuator, a pin extending across said recess, a roller on each of said pins for engagement with the respective adjacent surfaces of said actuator, and a means adjustably disposed in said body and extending into said slot into engagement with said actuator for yieldably retaining said actuator in various positions.

7. A holder for a welding electrode tip having a tapered end, comprising a body having a bore therein with a tapered outlet for receiving the tapered end of the tip, a slot extending through said body and being connected transversely to said bore, a reciprocable plunger in said bore extending into said slot at one end and into said tapered outlet at the other end and having a recess in said end, two spaced pins in said body extending through said slot, one of said pins being spaced further from the end of said plunger than the other, an actuator in said slot extending at both ends therefrom and having one surface at right angles to the axis of said plunger and the surface on the opposite side at an angle corresponding to the difference in distance of said pins, a pin extending across said recess, and a roller on each of said pins for engagement with respective adjacent surfaces of said actuator.

References Cited

UNITED STATES PATENTS

| 1,034,723 | 8/1912 | Mueller et al. | 279—1 |
|---|---|---|---|
| 1,037,799 | 9/1912 | Schafer | 279—1 |
| 1,050,385 | 1/1913 | Palmgren | 279—1 |
| 1,439,654 | 12/1922 | Watson | 279—1 |
| 1,503,541 | 8/1924 | Lintott et al. | 219—142 |
| 1,718,279 | 6/1929 | Dwyer | 279—1 |
| 1,786,029 | 12/1930 | Phillips | 279—1 |
| 2,379,983 | 7/1945 | Munson | 219—120 |
| 2,385,108 | 9/1945 | Seeloff | 219—120 |
| 2,429,825 | 10/1947 | Kruitbosch | 219—120 |
| 2,453,320 | 11/1948 | Huebner | 219—120 |
| 2,709,212 | 6/1953 | Macewkz | 219—120 |

RICHARD M. WOOD, *Primary Examiner.*

W. BROOKS, *Assistant Examiner.*